United States Patent [19]
Maeno et al.

[11] Patent Number: 5,429,343
[45] Date of Patent: Jul. 4, 1995

[54] FLUID-FILLED VIBRATION DAMPING DEVICE

[75] Inventors: Takashi Maeno; Kyoichi Fujinami; Norihiro Yamada; Yoshiki Shimoda, all of Aichi, Japan

[73] Assignee: Toyoda Gosei Co., Ltd., Japan

[21] Appl. No.: 258,233

[22] Filed: Jun. 10, 1994

[30] Foreign Application Priority Data

Jun. 11, 1993 [JP] Japan .................... 5-166372
Jun. 25, 1993 [JP] Japan .................... 5-180750

[51] Int. Cl.$^6$ .................................................. F16M 5/00
[52] U.S. Cl. ............................ 267/140.12; 267/219
[58] Field of Search ................... 267/140.12, 140.13, 267/219, 141.1–141.3; 248/562, 636; 180/300, 312

[56] References Cited

U.S. PATENT DOCUMENTS

| | | | |
|---|---|---|---|
| 5,102,108 | 4/1992 | Fujinami et al. | 267/140.12 |
| 5,145,155 | 9/1992 | Funahashi et al. | 267/219 |
| 5,156,379 | 10/1992 | Tabata | 267/219 |
| 5,170,999 | 12/1992 | Ishiyama | 267/219 |
| 5,213,313 | 5/1993 | Tsutsumida et al. | 267/140.12 |
| 5,221,077 | 6/1993 | Noguchi | 267/140.12 |
| 5,286,011 | 2/1994 | Strand | 267/140.12 |

FOREIGN PATENT DOCUMENTS

| | | | |
|---|---|---|---|
| 0368352 | 5/1990 | European Pat. Off. | 267/140.12 |
| 4088235 | 3/1992 | Japan | 267/140.12 |
| 4165140 | 6/1992 | Japan | 267/140.12 |
| 5087180 | 4/1993 | Japan | 267/140.12 |

Primary Examiner—Robert J. Oberleitner
Assistant Examiner—Chris Schwartz
Attorney, Agent, or Firm—Cushman Darby & Cushman

[57] ABSTRACT

In a fluid-filled vibration damping device, a rubber material is injection molded in the upper half of an inner space of a cylindrical insert plate 1 to form a damping rubber member 2 through which an inner tube 3 is retained. A concave 21 is formed in the center of the damping rubber member 2 in such a way that it extends from the periphery to a point close to the inner tube 3 such that both sidewalls thereof are left intact. The concave 21 provides a main fluid compartment A when the insert plate 1 is pressed and fixed in the outer tube. The insert plate 1 has a large concave in the lower half thereof and a plurality of openings are made in the sidewall of the concave 12 except for the bottom wall 121 thereof. A rubber layer 5, injection molded in the concave, has a central part of its width left intact in block form and part of this rubber layer provides a thin rubber wall that covers the openings in the sidewall of the concave 12 which face a cavity 53. When the insert plate 1 is pressed and fixed in the outer tube 4, a sub-fluid compartment B is formed between the outer tube 4 and the thin rubber wall which serves as a defining wall of the compartment B, and this compartment communicates with the main fluid compartment A via a flow constricting channel F around the insert plate 1.

6 Claims, 6 Drawing Sheets

$F_{SUB}$

FLUID-FILLED VIBRATION DAMPING DEVICE

BACKGROUND OF THE INVENTION

This invention relates to a fluid-filled vibration damping device, more particularly, to an improvement in the structure of a tubular fluid-filled vibration damping device of the type in which a damping rubber member, in which fluid compartments are formed, is provided between an inner and an outer tube.

A tubular vibration damping device has been proposed as a fluid-filled vibration damping device that can be constructed in a compact form and yet produces a satisfactory damping action to be used advantageously with engine mounts and other vibration sources. Typically, the tubular vibration damping device has a rubber material injection molded within a tubular insert plate to form not only a damping rubber member through which the inner tube extends to be retained thereby, but also, the walls of fluid compartments. The insert plate is then pressed into the outer tube in the working fluid.

Figure 1:
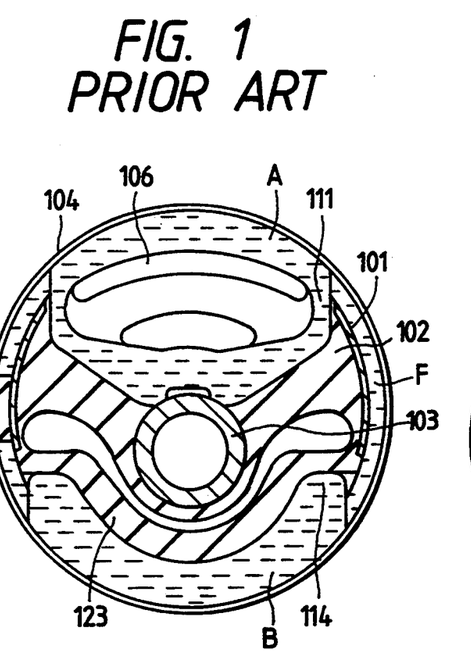
FIG. 1 is a cross-sectional view of a conventional fluid-filled vibration damping device.

An example of this conventional device is shown in FIG. 1. A tubular insert plate 101 has been pressed into an outer tube 104 and has a damping rubber member 102 formed as a molded part in the upper half thereof. An inner tube 103 for supportively coupling a pair of vibrating bodies (i.e., vibration sources) penetrates the rubber member 102 near its bottom wall. The central portion of the rubber member 102 concaves from the periphery of its upper half down to a point close to the inner tube 103, thereby forming a main fluid compartment A between the front and rear sidewalls (as seen in a direction normal to the paper).

The insert plate 101 concaves circumferentially in the central portion and it has openings 111 and 114 formed in its upper and lower halves, respectively (see FIG. 2); opening 111 is in registry with the main fluid compartment A whereas part of the rubber layer that is formed in the concave is stretched across the opening 114 to form a thin rubber wall 123. With the insert plate 101 being pressed into the outer tube 104, a sub-fluid compartment B is formed between the inner surface of the outer tube 104 and the thin rubber wall 123 which defines a wall of compartment B. The sub-fluid compartment communicates with the main fluid compartment A via a flow constricting channel F formed in the rubber layer in the concave. The main fluid compartment A has a stopper member 106 of a substantially, symmetrical shape in cross-section provided in its interior.

Figure 2:
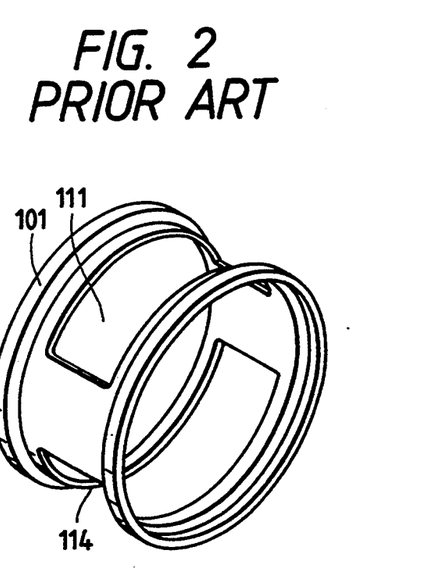
FIG. 2 is a perspective view of the insert plate of the apparatus shown in FIG. 1.

If the damping rubber member 102 deforms in response to a vibrational input, the working fluid flows between the main compartment A and the sub-compartment B via the flow constricting channel F, thereby producing a great damping force.

Figure 3:
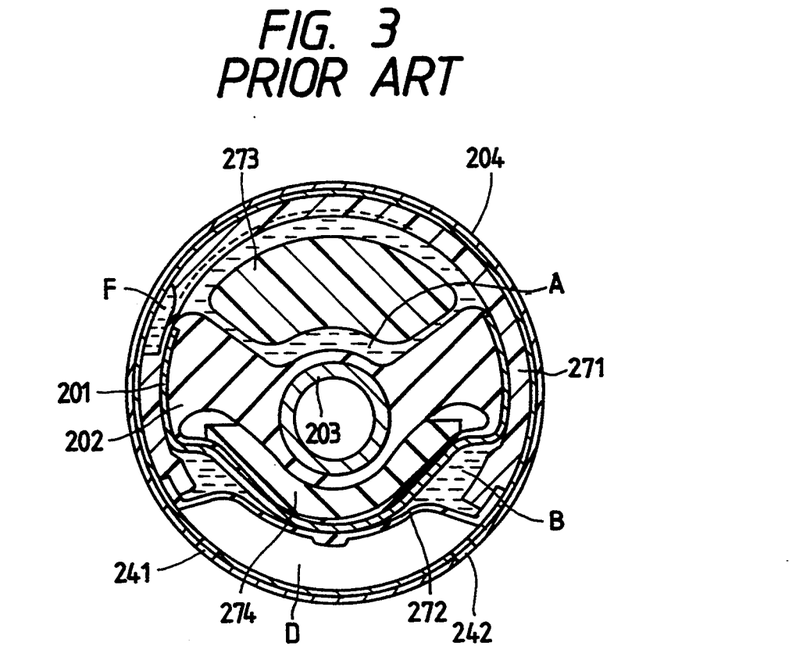
FIG. 3 is a cross-sectional view of another conventional fluid-filled vibration damping device.

Another example of the tubular fluid vibration damping device that has been proposed to date is shown in FIG. 3. A tubular insert plate 201 has been pressed into an outer tube 204 and has a damping rubber member 202 formed therewith in the upper half thereof. An inner tube 203 for supportively coupling a pair of vibrating bodies is buried through the rubber member 202 near its bottom wall. The central portion of the rubber member 202 concaves from the periphery of its upper half down to a point close to the inner tube 203, thereby forming a main fluid compartment A between the front and rear sidewalls (as seen in a direction normal to the paper).

The insert plate 201 concaves in the central portion of the entire circumference and an annular constricting member 271 is positioned in the concave. The insert plate 201 has a larger concave in its lower half and the periphery of a thin rubber wall 272 is held between the outer tube 204 and the edge of an opening in the constricting member 271, thereby forming a sub-fluid compartment B above the rubber wall and an air compartment D therebelow.

The main fluid compartment A and the sub-fluid compartment B can communicate with each other via a flow constricting channel F formed in the constricting member 271. The main fluid compartment A has a stopper member 273 of a substantially symmetrical cross-section provided in its interior. The damping rubber member 202 through which the inner tube 203 extends has a cushioning rubber plate 274 positioned below the bottom wall thereof.

If the damping rubber member 202 deforms in response to a vibrational input, the working fluid flows between the main compartment A and the sub-compartment B via the flow constricting channel F, thereby producing a great damping force.

Each of the two examples of the above described conventional tubular vibration damping device have deficiencies. In the first example of FIG. 1, the thin rubber wall 123 faces the inner tube 103 directly, although there is a certain clearance therebetween. If the inner tube 103 is displaced greatly downwardly by the vibrational input, it may potentially interfere with the thin rubber wall 123 and experience wear fatigue. Additionally, any excessive downward displacement of the inner tube 103 cannot be restricted effectively and the resulting excessive stress on the damping rubber member 102 can potentially reduce its durability.

In the second example of FIG. 3, the thin rubber wall 272 is formed as a separate part from the damping rubber member 202 and, after it is held between the constricting member 271 and the outer tube 204 in the working fluid, part of the fluid which has been trapped in the air compartment D is withdrawn through a pair of holes 241 and 242 that are formed in the sidewall of the outer tube 204 on the right and left sides. Thus, the manufacture of the second example of fluid-filled vibration damping device involves extra steps such as the storage and mounting of the thin rubber wall 272 and water draining, which adds to the overall production cost of the device.

SUMMARY OF THE INVENTION

An object of the present invention is to provide a fluid-filled vibration damping device which is constructed and arranged so as to increase the life of the damping rubber member and the thin rubber wall thereof.

Another object of the present invention is to provide a fluid-filled vibration damping device that is simple in construction and which can be manufactured at low cost.

The first object of this invention is attained by providing a fluid-filled vibration damping device in which a rubber material is injection molded in the upper half of the inner space of a cylindrical insert plate 1 to form a damping rubber member 2, an inner tube 3 penetrating through the central portion of the damping rubber member 2 in an area close to its bottom wall, the damping rubber member 2 being provided with surfaces defining a concave 21 extending from the periphery to a point close to the inner tube 3, the concave 21 being formed in the center of the rubber member 2 so as to leave two sidewalls thereof intact, the insert plate 1 having an opening 11 in a position corresponding to the concave 21 and being pressed and fixed in an outer tube 4 to form a main fluid compartment A. The insert plate 1 has surfaces defining a concave 12 in the center of the lower half thereof so as to insure a certain space is provided between the insert plate and the inner tube 3. The concave 12 has openings 13A, 13B, 13C and 13D provided in at least part of the sidewall 122 excepting the bottom wall 121. A rubber material is injection molded to have a thin rubber wall 51 stretched across the openings 13A-13D in the concave, thereby forming a sub-fluid compartment B between the outer tube 4 and the thin rubber wall 51, functioning as a compartment defining wall as the insert plate 1 is pressed and fixed in the outer tube 4. A groove 52 is formed circumferentially around the insert plate 1 in its center. The main fluid compartment A communicates with the sub-fluid compartment B via a flow constricting channel F that is formed by the groove 52 which provides a closed cross-section when the insert plate 1 is pressed and fixed in the outer tube 4.

When apparatus of the invention receives a vibrational input, the inner tube 3 is displaced and contacts the bottom wall 121 of the concave 12 in the inner plate which faces the inner tube 3 but which is normally spaced therefrom. Since the thin rubber wall 51 is formed across the openings 13A-13D in the sidewall 122 of the concave 12, the inner tube 3 in contact with the bottom wall 121 of the concave will not directly touch the thin rubber wall 51 and, hence, there is no chance for the development of wear fatigue and other problems occurring.

It should also be noted that excessive displacement of the inner tube 3 is prevented by its making contact with the bottom wall 121 of the concave in the insert plate 1 and this effectively increases the durability of the damping rubber member 2.

The second object of this invention can be attained by providing a fluid-filled vibration damping device in which a rubber material is injection molded in the upper half of the inner space of a cylindrical insert plate 1 to form a damping rubber member 2, an inner tube 3 being buried through the central portion of the damping rubber member 2 in an area close to its bottom wall, the damping rubber member 2 being provided with surfaces defining a concave 12 extending from the periphery to a point close to the inner tube 3. The concave 21 is formed in the center of the rubber member 2 so as to leave two sidewalls thereof intact, the insert plate 1 having an opening 11 in a position corresponding to the concave 12 and being pressed and fixed in an outer tube 4 to form a main fluid compartment A. The insert plate 1 has surfaces defining a concave in the center of the lower half thereof so as to insure a certain space is provided between the insert place and the inner tube 3, a rubber material being injection molded in the concave 12 to form thin rubber walls 51 and 52 in sections that are spaced from the bottom wall of the concave 12 and which are open to the exterior, thereby forming sub-fluid compartments B and C between the outer tube 4 and the thin rubber walls 51 and 52, functioning as compartment defining walls as the insert plate 1 is pressed and fixed in the outer tube 4, and wherein a groove 53 is formed circumferentially around the insert plate 1 in its center, the main fluid compartment A communicates with the sub-fluid compartment B and C via a flow constricting channel F that is formed by the groove 53 which provides a closed cross-section when the insert plate 1 is pressed and fixed in the outer tube 4.

In the above defined apparatus, the sub-fluid compartment B is formed exteriorly to the thin rubber walls 51 and 52 and, hence, both the damping rubber member 2, which makes a compartment wall of the main fluid compartment A and the thin rubber walls 51 and 52, which work as compartment defining walls of the sub-fluid compartment B, can be formed before the insert plate 1 is pressed into the outer tube 4 in the working fluid. Therefore, the time required to accomplish mounting and parts storage jobs can be greatly reduced as compared to the prior art practice of preparing the thin rubber wall 5 as a separate part and mounting it in the working fluid.

Further, the insert plate 1 in which the damping rubber member 2 and the thin rubber walls 51 and 52 have been formed need only to be pressed into the outer tube 4 in the working fluid so as to form not only the main fluid compartment A and the sub-fluid compartment B but also the connecting flow constricting channel F, without performing any extra step such as water draining.

It should also be mentioned that since the thin rubber walls 51 and 52 which are formed within the concave 12 in the insert plate 1 are spaced from the inner tube 3, there occurs no such problem that the inner tube 3, moving up and down in response to the vibrational input, will impinge against the thin rubber walls 51 and 52 to cause their fatigue. In addition, the thin rubber walls 51 and 52 are spaced from the bottom wall of the concave 12, so if they expand to deform on account of the working fluid flowing out of the main fluid compartment A, they soon contact the bottom wall 12 and further deformation is effectively restricted to insure that the endurance of the walls 51 and 52 will not be impaired by their excessive deformation.

DETAILED DESCRIPTION OF THE PRESENTLY PREFERRED EXEMPLARY EMBODIMENTS

Figure 4:
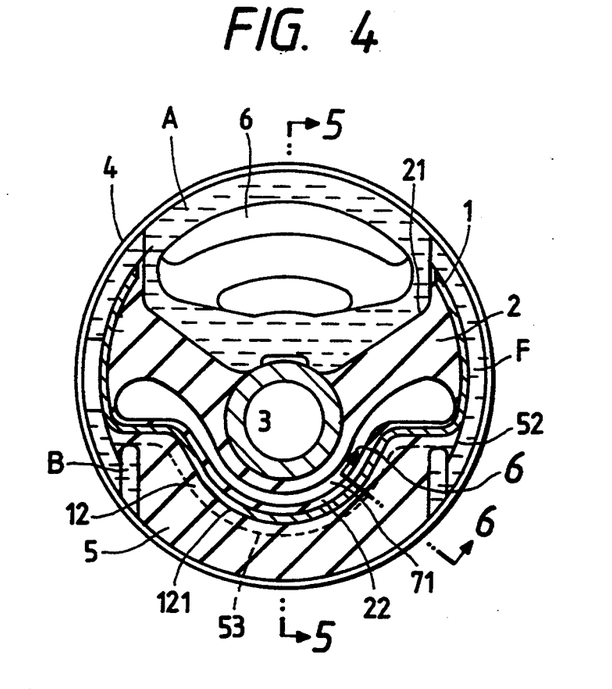
FIG. 4 is a cross-sectional view of a fluid-filled vibration damping device according to a first embodiment of the present invention.
Figure 5:
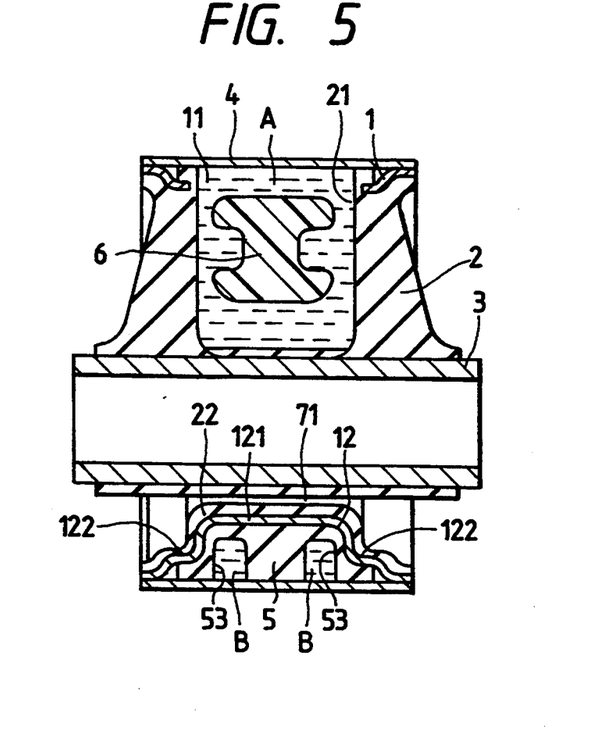
FIG. 5 is a longitudinal section of the apparatus taken on line 5—5 in FIG. 4.

FIG. 4 is a cross-sectional view of a fluid-filled vibration damping device according to a first embodiment of this invention, and FIG. 5 is a longitudinal section of the same apparatus taken on line 5—5 in FIG. 4. As shown in FIG. 4, an outer tube 4 which is to be pressed and fixed in a holder (not shown) has a tubular insert plate 1 pressed and fixed therein. A damping rubber member 2 is injection molded in the upper half of the tubular space of the insert plate 1. An inner tube 3 for supportively coupling a pair of vibrating bodies penetrates through the central part of the damping rubber member 2 in an area near the bottom wall which projects downwardly in a generally V-shape (see FIG. 5).

Figures 6, 7:
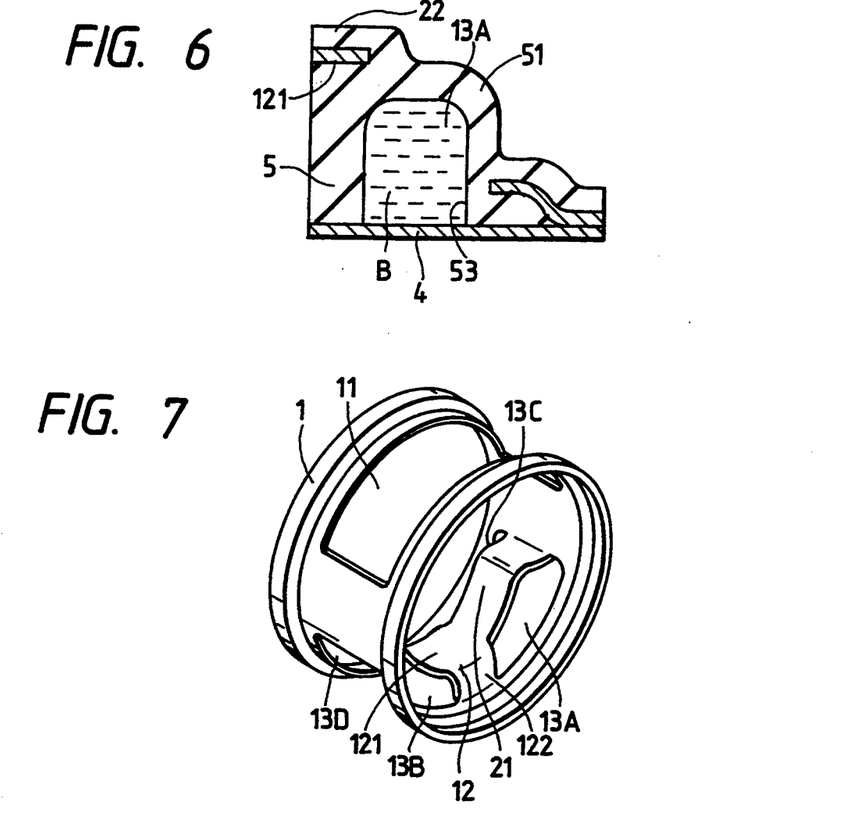
FIG. 6 is a partial sectional view taken in half of the apparatus along line 6—6 in FIG. 4.
FIG. 7 is a perspective view of the insert plate of the apparatus of FIG. 4.

The central portion of the damping rubber member 2 concaves from the periphery of its upper half down to a point close to the inner tube 3, thereby forming a hollow portion 21 between the front and rear sidewalls (directions right and left respectively as seen in FIG. 5); the hollow portion or concave 21 is in such a position that it faces an opening 11 defined in the peripheral surface of the upper half of the insert plate 1 (see FIG. 7). When the insert plate 1 is pressed into the outer tube 4 in the working fluid, the concave 21 is closed to define a main fluid compartment A. The compartment A has a resinous stopper member 6 of a substantially symmetrical shape in cross-section provided in its interior (FIG. 5).

The insert plate 1 concaves circumferentially in the central part of its width, thereby forming a space between the insert plate 1 and the outer tube 4 (FIG. 4), and the plate has a larger concave 12 in the lower half. The concave 12 is curved along the bottom of the damping rubber member 2 and a stopper rubber layer 22 formed on the surface of its bottom wall 121 opposes the inner tube 3 defining space 71.

A rubber material is injected into the central part of the circumferential concave in the insert plate 1 to form a rubber layer 5 and the rubber layer 5, which is thick in the concave 12 in the lower half of the insert plate 1, has the central portion left intact as a block that is curved along the inner circumference of the outer tube 4 while forming two cavities 53 with a cross-section of an inverted U-shape in right and left positions thereof (FIG. 5).

The right and left sidewalls 122 of the concave 12 (FIG. 5) in the insert plate 1 have four openings 13A, 13B, 13C and 13D formed in front and rear positions except in the central area (FIG. 7). As shown partly in FIG. 6, the rubber layer 5 positioned in each of the openings 13A–13D forms a thin rubber wall 51 that curves to bulge laterally.

The rubber layer 5 also has a groove 52 formed in the center of the circumference of one of its quarters (FIG. 4) and this groove extends from the concave 21 (defining the main fluid compartment A) to the cavity 53. When the insert plate 1 is pressed into the outer tube 4, fluid in the cavity 53 is closed to form a sub-fluid compartment B with the thin rubber wall 51 serving as a wall of compartment B. At the same time, the groove 52 is closed to provide a closed cross-section, thereby defining a flow constricting channel F that connects the main fluid compartment A with the sub-fluid compartment B.

When the inner tube 3 moves up and down in response to a vibrational input, the pressure in the main fluid compartment A increases or decreases accordingly, whereupon the working fluid flows into the sub-fluid compartment B via the flow constricting channel F to create a great vibration damping force. In this case, any excessive upward movement of the inner tube 3 is restricted by its contacting the stopper member 6 whereas any excessive downward movement of the inner tube is restricted by its contacting the stopper rubber layer 22 on the bottom wall of the concave 12 in the insert plate. Thus, the inner tube 3 is prevented from undergoing excessive displacements and a reduction in the endurance of the damping rubber member 2 can accordingly be avoided. Although a great load is exerted upon the bottom wall 121 including portions 121A of the concave 12 through the stopper rubber layer 22, the bottom wall 121 has satisfactory impact resistance since it is supported on its back by means of the rubber layer 5 left intact in block form.

It should also be mentioned that the thin rubber wall 51 which is formed on the sidewall 122 of the concave 12 will not touch the inner tube 3, in contact with the bottom wall 121, thus it is protected against wear fatigue.

In the first aspect of the invention described above, the stopper rubber layer 22 is useful for damping the shock on the concave 12 and for insuring more positive prevention of contact between the inner tube 3 and the thin rubber wall 51; it should, however, be noted that this stopper rubber layer is not an absolute requirement.

The rubber layer 5 which is left intact in block form may also be omitted if the bottom wall 121 of the concave 12 has a sufficient strength.

The second embodiment of the invention is described below.

Figure 8:
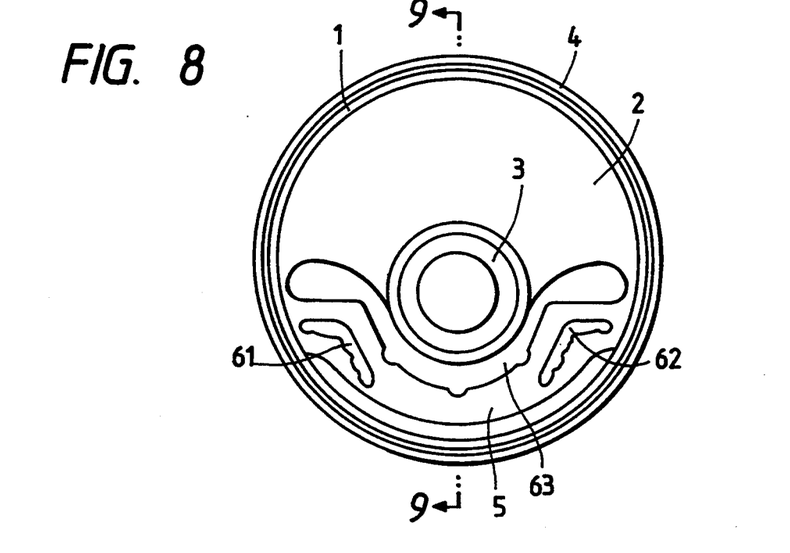
FIG. 8 is a front view of a fluid-filled vibration damping device according to a second embodiment of the present invention.
Figure 9:
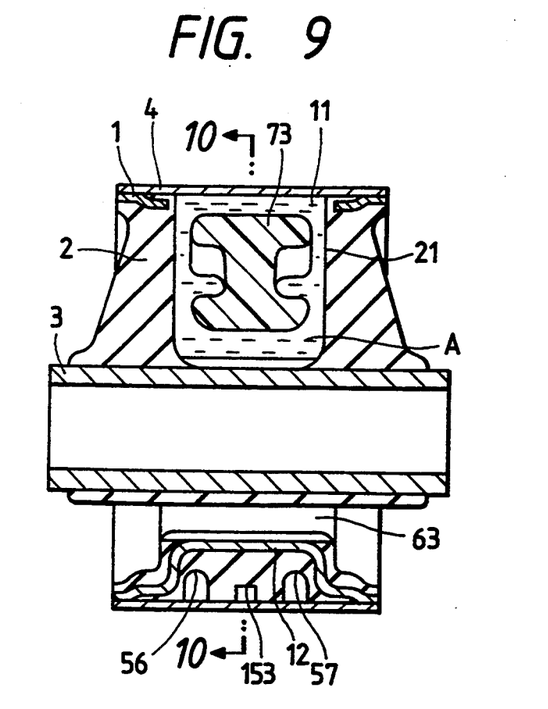
FIG. 9 is a longitudinal section of the apparatus taken along line 9—9 in FIG. 8.
Figure 10:
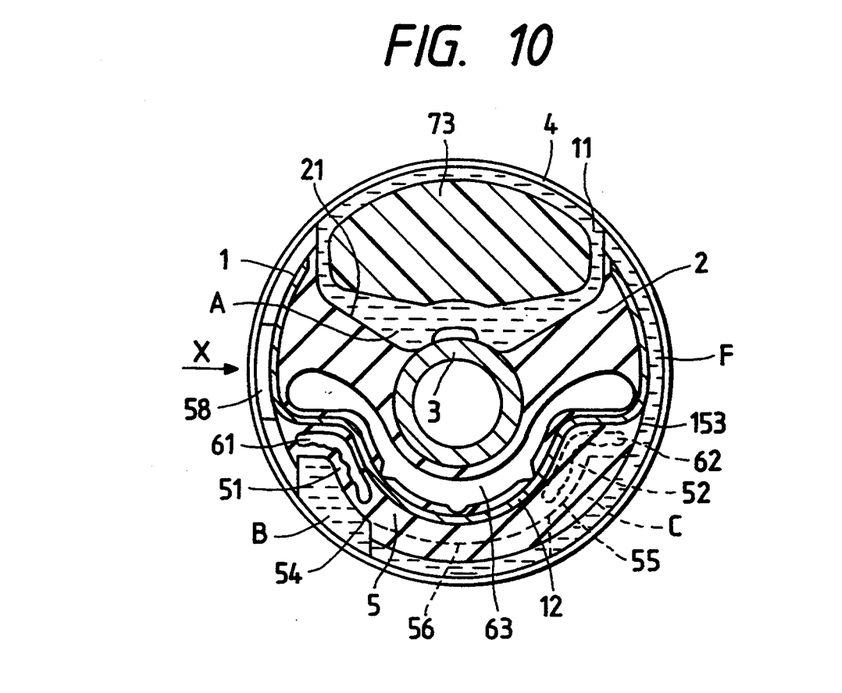
FIG. 10 is a cross section of the apparatus taken on line 10—10 in FIG. 9.

FIG. 8 is a side view of a fluid-filled vibration damping device according to a second embodiment of the invention, FIG. 9 is a longitudinal section of the same apparatus taken on line 9—9 in FIG. 8, and FIG. 10 is a cross section of the apparatus taken on line 10—10 in FIG. 8. The second embodiment of the invention is similar to that of the first embodiment. Therefore, like parts are given like numerals. As shown in FIG. 8, an outer tube 4 which is to be pressed and fixed in a holder (not shown) has a tubular insert plate 1 pressed and fixed therein, and a damping rubber member 2 is injection molded in the upper half of the tubular space of the insert plate 1. An inner tube 3 for supportively coupling a pair of vibrating bodies penetrates the central part of the damping rubber member 2 in an area near the bottom wall which projects downwardly in a generally V shape (FIG. 9).

The central portion of the damping rubber member 2 concaves from the periphery of its upper half down to a point close to the inner tube 3, thereby forming a hollow portion 21 between the front and rear sidewalls (right and left, respectively as seen in FIG. 9); the hollow portion or concave 21 is in such a position that it faces an opening 11 made in the peripheral surface of the insert plate 1. When the insert plate 1 is pressed into the outer tube 4 in the working fluid, the concave 21 is closed to define a main fluid compartment A. The compartment A has a resinous stopper member 73 provided in its interior (FIG. 10).

The insert plate 1 concaves circumferentially in the central part of its width, thereby forming a space between the insert plate 1 and the outer tube 4 (FIG. 10), and the plate has a larger concave 12 in the lower half thereof. The concave 12 is curved along the bottom of the damping rubber member 2 and opposes the inner tube 3 defining a space 63.

A rubber material is injected into the central part of the circumferential concave in the insert plate 1 to form a rubber layer 5 and the rubber layer 5, which is thick in the concave 12 in the lower half of the insert plate 1, has cavities 54 and 55 formed in left and right positions in FIG. 10 that are open to the exterior, leaving thin rubber walls 51 and 52 intact. The rubber wall 51 (or 52) has an elongated release hole 61 at the back thereof that penetrates therethrough in the direction of its width (in a direction normal to the paper) whereas the rubber wall 52 (or 51) has an elongated cavity 62 at the back that is defined by a partition formed in the central part of its width. The cavity 55 on the right side is indicated by a dashed line in FIG. 10 but, actually, a pair of such cavities 55 are formed in the direction of width as they are defined by the central partition.

The rubber layer 5 has a groove 153 with a rectangular cross-section (FIG. 9) formed circumferentially in the central portion of its periphery, except in a selected circumferential part 58; the groove 153 extends from the concave 21 (which defines the main fluid compartment A) to the cavity 54. The cavity 54 has large-diameter grooves 56 and 57 (FIG. 9) of a generally U-shaped cross section which extend, with the groove 153 interposed, from two transverse points of the cavity 54 circumferentially up to said two cavities 55. When the insert plate 1 is pressed into the outer tube 4 in the working fluid, the cavity 54 is closed to form a sub-fluid compartment B, whereas each of the cavities 55 forms another sub-fluid compartment C which is made substantially integral with the compartment B via a fluid channel that is formed by the closure of the grooves 56 and 57 and which permits free passage of the working fluid. At the same time, the groove 153 is closed to provide a closed cross section, thereby defining a flow constricting channel F that connects the main fluid compartment A with the sub-fluid compartment B.

When the inner tube 3 moves up and down in response to a vibrational input, the pressure in the main fluid compartment A increases or decreases accordingly, whereupon the working fluid flows into the sub-fluid compartment B via the flow constricting channel F to create a great variation in damping force. In this case, any excessive upward movement of the inner tube 3 is restricted by its contacting the stopper member 73 whereas any excessive downward movement of the inner tube is restricted by its contacting the bottom wall of the concave 12 in the insert plate 1. Thus, the inner tube. 3 will not come in direct contact with the thin rubber walls 51 and 52, which are thereby prevented from deterioration due to wear.

When the working fluid is flowing into the compartment B, the thin rubber walls 51 and 52 will expand but then, the release hole 61 or cavity 62 will shrink away, letting the rubber walls.51 and 52 contact the bottom wall of the concave 12. Thus, any excessive deformations of these rubber walls 51 and 52 is effectively prevented and this also contributes to increasing their durability. As a consequence, one can form the thin rubber walls 51 and 51 simultaneously with the damping rubber member 2 by the injection molding of the same kind of natural rubbers.

Figure 11:
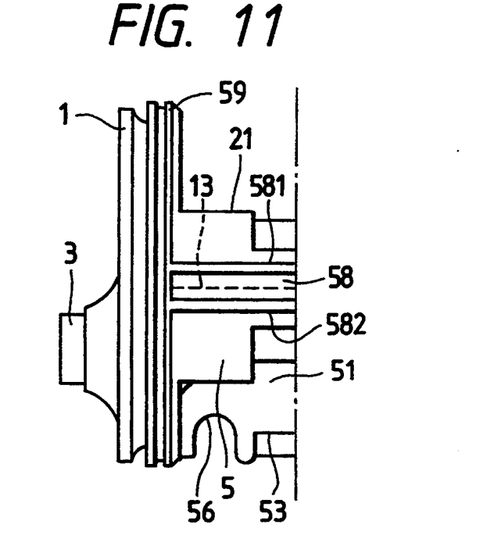
FIG. 11 is a side view of half of the apparatus as seen in the direction X in FIG. 10 after the injection molding of a rubber material.

FIG. 11 is a side view showing half of the apparatus according to the second embodiment of the invention as it is seen in the direction X in FIG. 10 after the injection molding of rubber material and with the outer tube 4 removed. The rubber layer 5 formed circumferentially around the insert plate 1 has a seal rib 59 that extends along the entire circumference at both lateral edges (only one of them is shown in FIG. 11). As also shown in FIG. 11, the circumferential part 58 where the groove 153 is not formed is provided with two spaced parallel seal ribs 581 and 582 which extend transversely between the two seal ribs 59.

Figure 12:
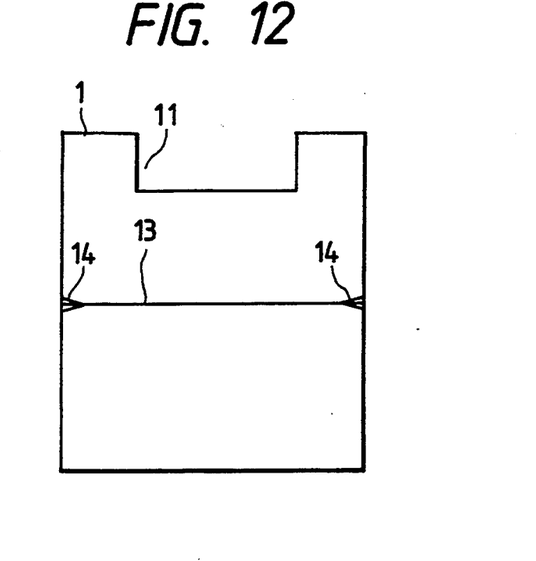
FIG. 12 is a side view of the insert plate before it is shaped by pressing.

As shown in FIG. 12, the insert plate 1 is formed as a tube by welding together abutting ends 13 of a rolled sheet material. The tube is then pressed into a specified shape, which is thereafter set in a mold, with proper positioning insured by a notch 14 that is cut in selected areas along both lateral edges of the abutting ends 13, and a rubber material is injection molded into the space of the tubular shape. As a result, the abutting ends 13 of the insert plate 13 can be correctly positioned within the space enclosed with the seal ribs 581 and 582 on the rubber layer 5 (FIG. 11). After welding, a raised bead will form at abutting ends 13 and, hence, the pressure area of the seal ribs 59 which contact the outer tube 4 will change, thus deteriorating their sealing performance, potentially causing the ingress of air into the main fluid compartment A in which negative pressure prevails. This problem, however, can be prevented by means of the seal ribs 581 and 582 which are formed transversely of the insert plate.

Thus, the insert plate 1 which can be formed of a sheet material offers an economic advantage as compared to the case of using a pipe material. Notches 14 are not essential for positioning the insert plate 1 correctly within a mold and the same object can be attained by using the edge of opening 11 in the insert plate 1 as a positioning reference.

The apparatuses according to the two examples described above are adapted so that shaking vibrations will be suppressed by the damping effect of the flow constricting channel F connecting the main fluid compartment A with the sub-fluid compartment B. However, if the vibrations to be controlled are in the idling region, rather than in the shaking region, the foregoing design works as a high-amplitude spring and hence is not very effective in suppressing idling vibrations.

Figure 13:
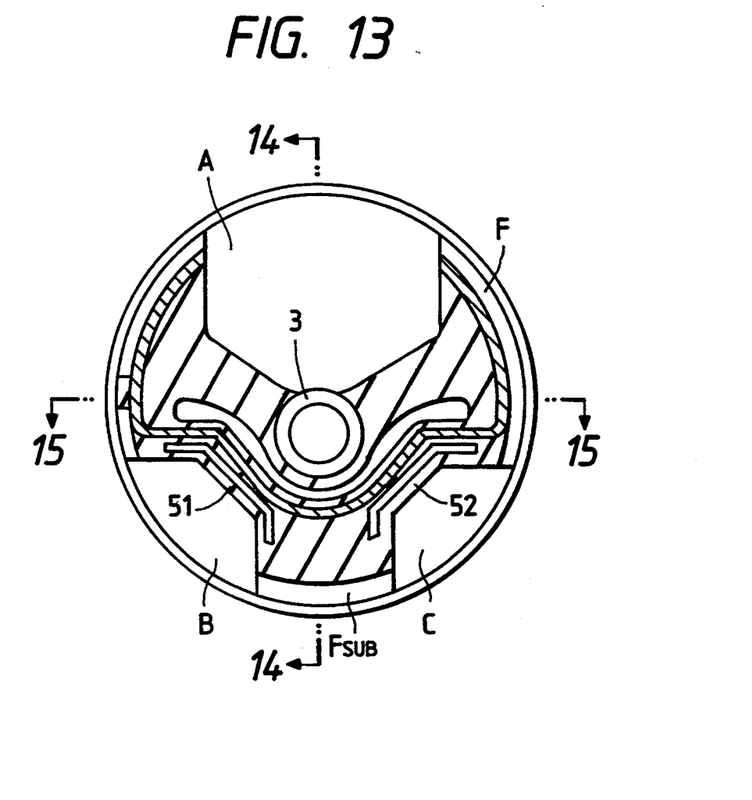
FIG. 13 is a cross sectional view of a fluid-filled vibration damping device of a third embodiment of the invention.
Figure 14:
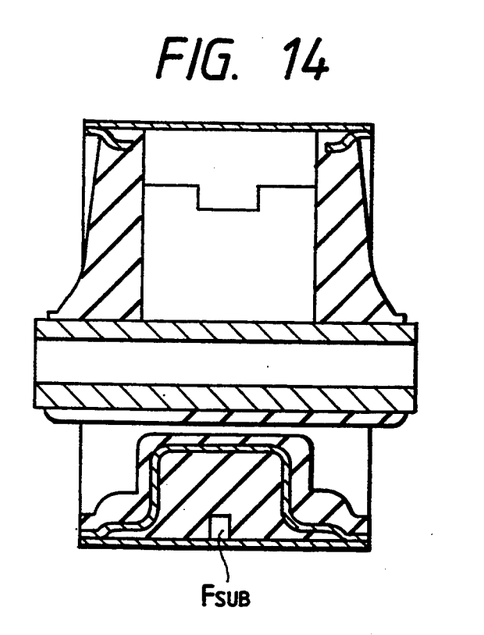
FIG. 14 is a longitudinal section of the device taken along line 14—14 in FIG. 13.
Figure 15:
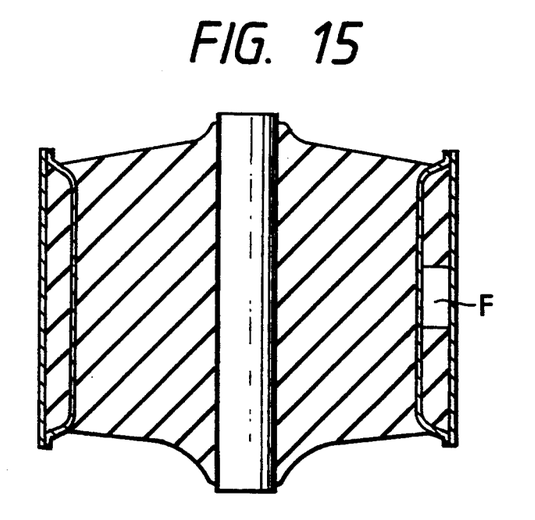
FIG. 15 is a longitudinal section of the device taken along line 15—15 in FIG. 13.

FIG. 13 shows an example of the invention that is designed for the specific purpose of solving the above mentioned problem. To this end, not only the flow constricting channel F which is already provided in the foregoing examples but also a sub-flow constricting channel $F_{SUB}$ is provided to interconnect the two sub-fluid compartments B and C. The flow constricting channel F is so set that it is larger in cross-sectional area than the sub-flow constricting channel $F_{SUB}$ or smaller in length. In addition, the rubber wall 52 positioned close to the main fluid compartment A is made more rigid than the rubber wall 51 positioned remote from the compartment.

According to this example, shaking vibrations are suppressed by the damping effect of the flow constricting channel F whereas the resonance by the sub-flow constricting channel $F_{SUB}$ provides a low-amplitude spring in the idling region. Hence, both shaking and idling vibrations can be damped by a single unit, of fluid-filled vibration damping device.

As described above, there is provided a fluid-filled vibration damping device according to the first aspect of the invention that is capable of effectively preventing a reduction in the durability of the damping rubber member and the thin rubber walls and which, therefore, has a long-life.

According to the second embodiment of the invention, both the damping rubber member and the thin rubber walls can be formed simultaneously in the insert plate by the injection molding of the same kind of rubber material. In addition, one only needs to press the insert plate into the outer tube in the working fluid so as to form not only the main fluid compartment and the sub-fluid compartment but also the flow constricting channel which connects these compartments; hence, the time and cost for parts mounting and other steps of manufacture can be markedly reduced.

What is claimed is:

1. A fluid-filled vibration damping device comprising:
   an outer tube;
   a tubular insert fixed within said outer tube;
   a damping rubber member injection molded in an upper half of an inner space of said tubular insert;
   an inner tube penetrating a central portion of said damping rubber member, said damping rubber member having surfaces defining a concavity which extends from a periphery of the damping rubber member to a point close to said inner tube, wherein said tubular insert has an opening in a position corresponding to said concavity so as to form a main fluid compartment, said tubular insert having surfaces defining another concavity in a lower half thereof and spaced from said inner tube, a rubber material being injection molded in said another concavity to form diaphragms in sections that are spaced radially outwardly from a portion of said tubular insert surfaces defining a bottom of said another concavity and to form a groove that extends at least partially circumferentially around said tubular insert, said diaphragms being spaced from the outer tube thereby forming a sub-fluid compartment between said outer tube, said diaphragms defining compartment walls of the sub-fluid compartment, said main fluid compartment communicating with said sub-fluid compartment via a main flow constricting channel that is defined by said circumferential groove which provides a closed cross section when said tubular insert is fixed into said outer tube.

2. A fluid-filled vibration damping device as claimed in claim 1, further including a second sub-fluid compartment in communication with said sub-fluid compartment via a sub flow constricting channel.

3. A fluid-filled vibration damping device as claimed in claim 2, wherein said main flow constricting channel is constructed and arranged to be larger in cross-sectional area than the sub flow constricting channel.

4. A fluid-filled vibration damping device as claimed in claim 2, wherein said main flow constructing channel has a length less than the sub-flow constricting channel.

5. A fluid-filled vibration damping device as claimed in claim 2, when a portion of a rubber wall positioned close to the main fluid compartment is made more rigid than a portion of said rubber wall positioned remote from said main fluid compartment.

6. A damping device as in claim 1 wherein the said portions of said tubular insert surfaces provide rigid back support at a location, radially inwardly of said diaphragms, to limit deformation of said diaphragms thereby preventing fractional contact between said diaphragms and said inner tube.

* * * * *